United States Patent Office 3,548,025
Patented Dec. 15, 1970

1

3,548,025
NOVEL SILICON - SUBSTITUTED GLYCOL
MONOESTERS AND PROCESS FOR THEIR
PREPARATION
Götz Koerner, Mulheim (Ruhr), Germany, assignor to
Th. Goldschmidt A.G., Essen, Germany
No Drawing. Continuation-in-part of application Ser. No.
511,331, Dec. 3, 1965. This application June 11, 1968,
Ser. No. 736,014
Claims priority, application Germany, Dec. 17, 1964,
G 42,299
Int. Cl. C08g 31/44; C07f 7/04
U.S. Cl. 260—824     24 Claims

ABSTRACT OF THE DISCLOSURE

Novel silicon-substituted glycol monoesters of the structural formula $$R^2-\underset{\underset{R^3}{|}}{\overset{\overset{R^1}{|}}{Si}}-O-\underset{|}{C}-\underset{|}{C}-OAc$$

wherein Ac is acyl of a mono- or dicarboxylic acid and $R^1$, $R^2$ and $R^3$ are the same or different and stand for OAc, alkyl of 1–6 carbon atoms, vinyl, aryl, siloxy or polysiloxy, wherein the remaining valences at the silicon are satisfied by alkyl or aryl, and process for their preparation.

Silicon acylates of the general formula $$R^2-\underset{\underset{R^3}{|}}{\overset{\overset{R^1}{|}}{Si}}-OAc$$

wherein Ac, $R^1$, $R^2$ and $R^3$ have the above meaning, are reacted with specified epoxy group containing compounds under anhydrous conditions and in the presence of a tertiary amine catalyst.

CROSS REFERENCE TO PRIOR APPLICATION

This is a continuation-in-part of application Ser. No. 511,331 filed Dec. 3, 1965 now abandoned.

SUMMARY OF THE INVENTION

This invention relates to a process for preparing silicon substituted glycol monoesters and to novel cured or curable silicone modified epoxy resins.

It has previously been suggested to link silicon compounds with organic epoxy compounds under simultaneous rupture of the epoxy ring. Chlorides or bromides of silicon have thus been proposed for this purpose. Reference is thus had to the book "Organosilicon Compounds" by C. Eaborn, 1960. The reaction described may be represented by the following equation:

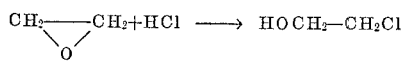

It will be noted that the formula or equation indicates the formation of chlorohydrines which are esterified with silicon. The following reaction mechanism has been proposed for this reaction in which, according to the chemical literature, traces of HCl which usually are always present in halogen silanes, are supposed to exert a catalytic action:

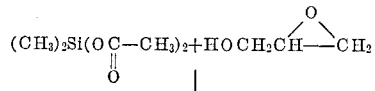

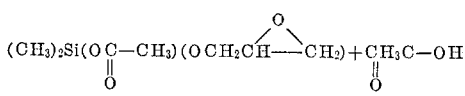

On the other hand, it is also known that various methyl acetoxysilanes react with glycide under esterification and without rupturing the epoxy ring. This known reaction has been described by K. A. Andrianov and V. G. Dubrovina Dokl. Akda. Nauk. S.S.S.R. 108 (1956) 83 and may be represented by the following formula:

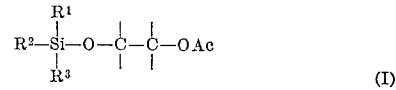

Analogous reactions have been observed with the use of methyl diacetoxysilane and methyltriacetoxysilane. Further, the products obtained in this manner are not thermally stable.

In view of the teachings of the prior art as referred to hereinabove, it is certainly surprising that silicon-substituted glycol monoesters containing the structural unit $$R^2-\underset{\underset{R^3}{|}}{\overset{\overset{R^1}{|}}{Si}}-O-\underset{|}{C}-\underset{|}{C}-OAc \quad (I)$$

can be prepared in accordance with the invention by reacting silicon acylates of the general formula $$R^2-\underset{\underset{R^3}{|}}{\overset{\overset{R^1}{|}}{Si}}-OAc \quad (A)$$

with epoxy group-containing compounds.

In the above Formulae I and A Ac is acyl of a mono- or dicarboxylic acid; and $R^1$, $R^2$ and $R^3$ are the same or different and stand for O—Ac, alkyl of 1–6 carbon atoms, vinyl, aryl, siloxy or polysiloxy, the remaining valences of the siloxy or polysiloxy being satisfied by alkyl, preferably methyl, or aryl.

The reaction between the silicon acylate of the indicated general formula and the epoxy group-containing compound is preferably carried out at elevated temperatures and must be performed in the presence of a tertiary amine as catalyst and under anhydrous conditions.

The term "epoxy group containing compounds" when used to describe the inventive reaction is deemed to refer to the compound

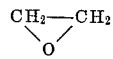

or to compounds of the formula

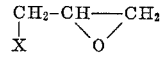

wherein X is hydrogen or OR, R representing unsubstituted or substituted alkyl or aryl. Specific compounds embraced by the above formula are, for example

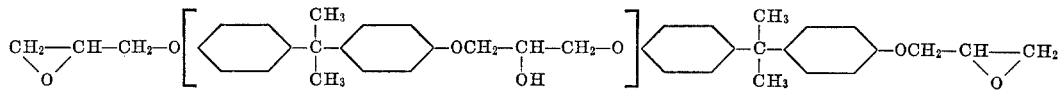

wherein z has preferably a value of between 0 to 5; 3,4-epoxycyclohexylethyleneoxide and 6-methyl-3,4-epoxycyclohexanecarboxylic acid - 6 - methyl-3,4-epoxycyclohexyl-1-methylester and

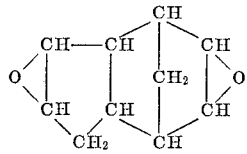

The inventive process takes place in the absence of hydrogen halide. This is in contrast to the reaction of epoxy group-containing compounds with silicon-containing compounds which have halogen linked to the silicon and wherein the hydrogen halide acts in catalytic manner.

In contrast to the known reactions, the inventive reaction is catalyzed by tertiary amine. For this reason it must be concluded that the inventive reaction is based on a different reaction mechanism than the reaction mechanism of known processes previously referred to.

In carrying out the inventive process, it would have been reasonable to fear that the silicon acylates, which serve as starting compound, would react with already formed silicon-substituted glycol monoesters under the formation of SiOSi-linkages, whereby glycol diesters would additionally be formed, corresponding to the following reaction scheme:

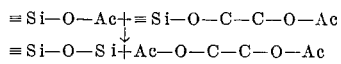

Reactions of the above-indicated nature are known, and in this connection reference is had to K. A. Andrianov et al., Journal of General Chemistry (Russia) 26, 1102 (1956) and F. A. Henglein et al., German Pat. 947,739. However, this side reaction was not observed in the inventive process. In the inventive reaction, the silicon acylate reacts rather with the epoxy group to form a Si—O—C linkage.

Acyloxysiloxanes corresponding to Formula A may be prepared according to patent application Ser. No. 431,-448.

As set forth above, it is an important feature of the invention that the reaction is carried out in the presence of tertiary amine as catalyst. Suitable tertiary amines for the indicated purpose are ethylmorpholine, triethylenediamine and compounds of the formula

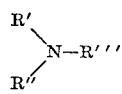

wherein R', R'' and R''' are the same or different and stand for lower alkyl such as methyl, ethyl or propyl. Those tertiary amines are preferred which—upon completed reaction—can be separated from the reaction product by distillation. Triethylamine is an example for such a tertiary amine.

It has also been observed that the process is advantageously carried out in the presence of inert solvents. Suitable inert solvents for the inventive purposes are benzene, toluene, dioxane, carbontetrachloride and decaline. No water is, however, permitted to be present.

Although the inventive process takes place at room temperature, it is oftentimes of advantage to operate at elevated temperatures, preferably in a temperature range of about 50–150° C.

The acyl group may be derived from mono- or dicarboxylic acids. Both aromatic and aliphatic carboxylic acids are suitable and the acids may be either saturated or unsaturated. Consequently, it will be appreciated that the structure of the carboxylic acid can be arbitrarily varied for the purposes of this invention. However, an exception in this respect are those dicarboxylic acids which have a tendency relatively readily to split off water intramolecular under the formation of a cyclic anhydride like phthalic acid, maleic acid and succinic acid. The exception of these dicarboxylic acids is mentioned since acyloxysilicon compounds of such dicarboxylic acids are not stable but decompose immediately under the formation of the anhydrides on the one hand and of Si—O—Si linkages on the other hand. Although a very large number of carboxylic acids are suitable for the purposes of this invention, a selected number is mentioned in the following by way of example: acetic acid, propionic acid, lauric acid, acrylic acid, methacrylic acid, linoleic acid, linolenic acid, benzoic acid, adipic acid, fumaric acid and terephthalic acid.

As previously mentioned, the groups $R^1$, $R^2$ and $R^3$ may each be the same as the group OAc.

In addition, the $R^1$, $R^2$ and $R^3$ groups may designate alkyl, aryl, siloxy or polysiloxy. In case of siloxy and polysiloxy, the remaining valences at the silicon are satisfied by alkyl, preferably methyl, or aryl. In respect to the alkyl groups, lower alkyl, to wit, methyl, ethyl and propyl, are the preferred ones. However, alkyl groups of longer carbon chain with up to 6 carbon atoms are also feasible for the purposes of this invention. The carbon chain of the alkyl may be branched. It is also within the scope of this invention to employ alkyl groups which have additional functional groups, as for example the CN group or halogen substituents, in particular chlorine. The substituents $R^1$, $R^2$ and/or $R^3$ may, however, also stand for aryl, in which event the phenyl group is the preferred one. The phenyl group may be substituted, in the same manner as the alkyl groups. A suitable substituent is halogen, preferably chlorine. Further, $R^1$, $R^2$ and $R^3$ or either of them are siloxy or polysiloxy, then the silicon atoms of these groups are linked to the hydrocarbon groups in addition to the linking oxygen atoms. These hydrocarbon groups correspond to those which have been mentioned for $R^1$, $R^2$ and $R^3$.

Examples of suitable silicon acylates which contain polysiloxy groups are compounds as they are described hereinbelow by the Formulae I through V. Formulae II through V represent particular examples of the general total Formula I.

$$R^4{}_xSiO_y(OAc)_{4-(x+2y)} \qquad (I)$$

In this formula, $R^4$ stands for hydrocarbon having 1–6 carbon atoms, preferably methyl, phenyl or vinyl; $x=0$–2.1, preferably 1.0–2.0; $y=0.5$–1.3, preferably 0.75–1.15; and $4>x+2y\geq1$.

The acyl group Ac has the previously indicated meaning and may be derived from monocarboxylic acids or dicarboxylic acids. In the latter case, OAc stands for an acid equivalent. Compounds of the following structure correspond to this formula:

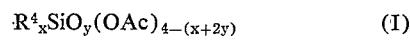

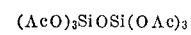

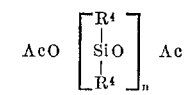

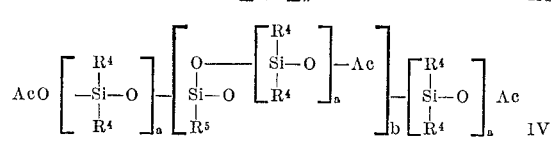

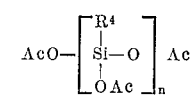

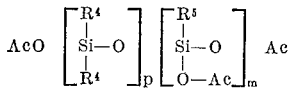

In these formulae, Ac and $R^4$ have the previously indicated meaning; $R^5$ has the same meaning as given for $R^4$; however, $R^4$ and $R^5$ need not be the same within the same molecule; $m$, $p$, $a$ and $b$ are suitable numbers between 0–100, preferably between 0–20; $n$ is any suitable number between 1–100, preferably 1–20; and $a$ and $b$ as well as $p$ and $m$ cannot be zero at the same time.

The tertiary amine catalyst amounts should preferably be about $2.10^{-3}$ to $1.10^{-1}$ mole/val acid in the acyloxysiloxane or -silane. An amount of $2.10^{-2}$ mole/val acid has been found to be particularly suitable.

The epoxy group containing compounds, as set forth above, are in the simplest case ethyleneoxide and propyleneoxide. Suitable are moreover epichlorohydrine and glycide ethers as, for example, n-butylglycide ether. Furthermore, compounds containing epoxy groups are usable which are formed by the reaction of bisphenol A (4,4'-dihydroxydiphenyl-2,2'-propane) with epichlorohydrine. Such compounds are available on the market in large numbers, for example under the trade designations "Epikote" or "Araldit." Such compounds correspond to the formula:

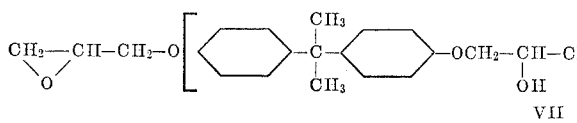

VII

In this formula, $z$ has preferably a value of between 0 to 5.

It follows that the inventive process is particularly suitable for incorporating silicon compounds into epoxy resins including uncured epoxy resin products, in which case an ester group is simultaneously incorporated into the molecule. A person skilled in this particular art will realize that many possibilities to modify the characteristics of such resins or their uncured pre-products are feasible according to the teachings of this invention.

Aliphatic and cycloaliphatic polyepoxies can also be reacted with silicon acylates in the inventive manner. Suitable polyepoxies are 3,4-epoxycyclohexylethyleneoxide and 6-methyl-3,4-epoxycyclohexanecarboxylic acid-6-methyl-3,4-epoxycyclohexyl - 1 - methylester which are available on the market under the name "Unox Epoxide" 206 and 201. The diepoxidized dicyclopentadiene of the following formula is also suitable for the inventive purpose:

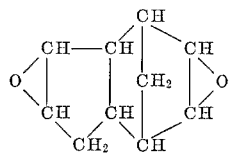

Equally suitable is the polyglycide ether of pentaerythrite which is available on the market under the trade designation "Epikote 162."

There are two possibilities for the production of silicon-modified epoxy resins in accordance with the inventive process. According to one embodiment, less than the equivalent amount of acyloxy —Si groups relative to the epoxy groups may be employed. In this manner products are obtained which, due to their epoxy content, may be further cured or hardened by means of the customary hardeners. Such products may, for example, be liquid products which may be used as casting resins or caulking masses. According to the second embodiment, substantially equivalent amounts of epoxy and acyloxy-Si groups may be used in which event the final resin products are directly formed. In this embodiment, the inventive principle thus causes simultaneous linking and curing.

The inventive process proceeds substantially quantitatively. For example, it may be performed so that the components to be reacted, to wit, silicon acylate and epoxy, are heated in the form of a mixture together with the tertiary amine, for example triethylamine. The heating can be effected for several hours, for example 2 to 10 hours, at a temperature of about between 100–120° C. If one proceeds in this manner, generally a quantitative reaction will take place which can be readily observed by means of infrared spectroscopic methods. Another possibility for carrying out the inventive process resides in adding silicon acylate in drop-wise manner to a mixture consisting of epoxy and tertiary amine catalyst at a temperature of about 100–150° C. However, the reaction takes place also at room temperature or only slightly elevated temperatures. In this event, however, longer reaction periods have to be expected. As previously stated, the reaction must always be carried out under anhydrous conditions.

In view of the great variety of starting compounds which can be used in the inventive process, the reaction products obtained may vary widely in respect to their physical and chemical characteristics. The inventive process can be used directly for hardening of uncured epoxy

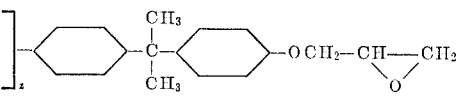

resin products. For this purpose, the acylates of dicarboxylic acids, such as adipic acid, fumaric acid and terephthalic acid, are particularly suitable. The silicon-modified epoxy resins obtained in this manner exhibit improved thermic stability and have great hardness. Epoxy resins which have been modified by compounds of Formula III possess a particularly improved flexibility. The adhesion capability of the epoxy resins, primarily at silicic acid-containing surfaces, is greatly improved at the same time. Silicic acid-containing surfaces are, for example, glass surfaces or ceramic surfaces. For this reason, such modified epoxy resins are suitable for the production of glass fiber laminates. Due to the improved adhesion of the material, the additional use of a glass fiber finish is rendered unnecessary. Products which are derived from silicon acylates with conjugated unsaturated carboxylic acids are particularly interesting from a lacquer technical point of view. This is so because such products still contain epoxy groups so that they may be subsequently hardened. In addition, due to the presence of the conjugated double bonds, they are capable of drying. Examples of suitable silicon acylates are such which are derived from (meth)acrylic acid, linolenic acid, fumaric acid and linoleic acid.

Resins which can be cast or cured and which are prepared in accordance with this invention distribute over a base surface in a much improved manner than the unmodified product. Contrary to the unmodified product, crater-free, securely adhering coatings are obtained on metal and glass surfaces.

The invention will now be described by several examples, it being understood, however, that these examples are given by way of illustration and not by way of limitation and that many changes may be effected in process conditions and starting materials without affecting in any way the scope and spirit of this invention as recited in the appended claims.

EXAMPLE I

Synthesis of a mixture of 1-n-butoxy-3-acetoxy-2-trimethylsiloxypropane and 1-n-butoxy-2-acetoxy-3-trimethylsiloxypropane A mixture consisting of 26.4 grams (0.2 mole) of trimethylacetoxy silane, 26 grams (0.2 mole) of n-butylglycide ether and 0.26 gram of triethylamine is heated for 25 hours to 100° C. the C=O band of the

grouping gradually disappears completely in the infrared spectrum under simultaneous appearance of the C=O band of the

grouping.

The reaction product is distilled. The yield is 46.7 grams (89% of the theoretical amount). Boiling point$_{0.3}$ 77–81° C.

*Analysis.*—Calculated (percent): Si, 10.7; C, 54.9; H, 9.9; CH$_3$CO$_2$, 22.5. Found (percent): Si, 10.2; C, 54.1; H, 10.0; CH$_3$CO$_2$, 21.9.

Pursuant to the nuclear magnetic resonance spectrum (NMR), the product consists of 75% of 1-n-butoxy-3-acetoxy-2-trimethylsiloxypropane and 25% of 1-n-butoxy-2-acetoxy-3-trimethylsiloxypropane.

EXAMPLE II

Reaction of a siloxane of the general Formula III ($R^4$=CH$_3$; n=7.95) with Epikote 162 (which is the reaction product of pentaerythrite and epichlorhydride)

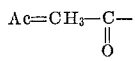

A mixture consisting of 162 grams (1 epoxy equivalent) of Epikote 162, 86.3 grams (0.25 acid equivalent) of the $\alpha,\omega$-diacetoxydimethylsiloxane of the above formula, 250 grams of xylene and 0.1 gram (0.001 mole) of diazabicyclooctane (triethylenediamine) was heated for 7 hours to 120° C., the xylene, together with the diazabicyclooctane (triethylenediamine), was thereafter distilled, the last traces removed by distillation in vacuum. A liquid product was obtained which was 0.27 epoxy equivalent in 100 grams (the theoretical amount would be 0.304 epoxy equivalent in 100 grams). The

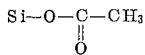

groups have completely disappeared as is demonstrated in the infrared spectrum. The product can be hardened to a solid resin at room temperature with diethylenetriamine.

EXAMPLE III

Reaction of a liquid diepoxy on bisphenol A basis with a diacetoxypolydimethylsiloxane (15% silicone in the end product)

1870 grams (9.33 epoxy equivalents) of a liquid epoxy of the Formula VII with a molecular weight of 401 were admixed with 2500 ccm. of xylene. 300 ccm. xylene were distilled off in order to remove any water which possibly may be present. Thereafter, 2.7 grams (0.02 mole) of N,N-dimethylbenzylamine were added to the mixture. The mixture was boiled under reflux and 330 grams (1.002 val acid) of a siloxane of the Formula III ($R^4$=CH$_3$;

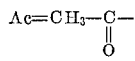

molecular weight 659, and produced according to U.S. patent application Ser. No. 431,448) were added to the mixture in drop-wise manner. The addition is effected within 30 minutes and under agitation. The reaction is completed after further heating for about 1–2 hours at reflux temperature as can be observed in the infrared spectrum by means of the carbonyl band. Finally, the xylene and the N.N-dimethylbenzylamine were distilled in vacuum. In order to remove the N.N-dimethylbenzylamine completely, it is recommended to add repeatedly small amounts of xylene after distillation and after each addition of such small amounts again to distill in vacuum until the N.N-dimethylbenzylamine has been completely expelled from the reaction mixture. The epoxy content of the liquid product amounts to 0.38 equivalent in 100 grams. Theoretically, 0.3785 equivalent in 100 grams would have to be expected. The product is hardenable or curable in the usual manner, for example with polyamines.

EXAMPLE IV

Reaction of a liquid diepoxy on bisphenol A basis with a diacetoxypolydimethylsiloxane (30% silicone in the final product)

In analogous manner, as described in Example III, 1540 grams (7.86 epoxy equivalents) of a diepoxy of the Formula VII of the molecular weight 392 are admixed with 2500 ccm. of toluene. Any water that may be present in the mixture is removed by distilling off 300 ccm. The remaining solution is reacted in the manner described in Example III under addition of 4.05 grams (0.04 mole) of triethylamine with 660 grams (2.005 acid equivalents) of the diacetoxypolydimethylsiloxane which was used in Example III. After removal of the toluene and the triethylamine, a liquid product remains which has an epoxy content of 0.265 equivalent in 100 grams. Theoretically, 0.260 equivalent per 100 grams would have to be expected. The product can be cured in the usual manner, for example with polyamines.

EXAMPLE V

Reaction of a diepoxy on bisphenol A basis with an acetoxypolysiloxane of Formula VI

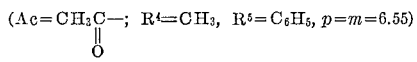

produced by reaction of the corresponding chlorosiloxanylsulfate solution in dioxane (50%)—obtained according to U.S. Pat. 3,183,254—with sodium acetate according to U.S. patent application Ser. No. 431,448 (20% silicone in the final product)

80 grams (0.408 epoxy equivalent) of a diepoxy of the Formula VII having a molecular weight of 392 were admixed with 120 ccm. toluene. Any possible water present in the mixture is removed by distillation of 20 ccm. of toluene. This solution is reacted in the manner described in Example III under addition of 0.196 gram (0.00194 mole) of triethylamine with 20 grams (0.0969 acid equivalent) of the above-described acetoxypolysiloxane of Formula VI. The reaction time amounts to two hours. After removal of the toluene and the triethylamine in the described manner, a product remains which has an epoxy content of 0.307 epoxy equivalent in 100 grams. This product is still flowable at room temperature. Theoretically, 0.311 epoxy equivalent per 100 grams would have to be expected. The product is curable in the usual manner, for example with polyamines or anhydrides.

EXAMPLE VI

Reaction of a liquid diepoxy on bisphenol A basis with an acetoxypolysiloxane of Formula V

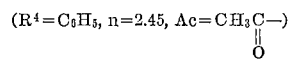

produced by reaction of a corresponding partial phenyltrichlorosilane hydrolysate with sodium acetate (16.6% silicone in the final product)

125 grams (0.624 epoxy equivalent) of a liquid diepoxy of the Formula VII having a molecular weight of 401 were admixed with 180 ccm. of toluene. Any possible water which may be present in the mixture is removed by distilling of 30 ccm. of toluene. This solution is reacted in the manner described in Example III under addition of 0.21 grams (0.002075 mole) of triethylamine with 25 grams (0.205 val acid) of the above-mentioned acetoxypolysiloxane of Formula V. The reaction time amounts to 3.5 hours. After removal of the toluene and the triethylamine in the indicated manner, a product remains which is flowable at room temperature and which has an epoxy content of 0.26 equivalent per 100 grams. Theoretically, 0.279 equivalent per 100 grams should be formed. The product is hardenable in the usual manner, for example with polyamines.

EXAMPLE VII

Reaction of a diepoxy on bisphenol A basis with an acyloxysiloxane of the Formula V ($R^4$=50 mole percent $CH_3$ and 50 mole percent $C_6H_5$, Ac=the acyl radical of a synthetic carboxylic acid which under the name Versatic 911 is available on the market. This acid is highly branched, is partially cyclic, contains up to 90% tertiary carboxylic groups and has a molecular weight of 177.5; $n$=5.13), produced by the reaction of an about 50% chlorosiloxanylsulfate solution in dioxane, prepared according to U.S. Pat. 3,183,254, with Versatic 911 and triethylamine under addition of benzene according to U.S. patent application Ser. No. 431,448; (20% of silicone in the final product)

240 grams (1.243 epoxy equivalents) of a diepoxy of the Formula VII (molecular weight 386) are admixed with 350 ccm. of toluene. By distilling 50 ccm. of toluene, any possible water is expelled. This solution is reacted in the manner described in Example III under addition of 0.53 gram (0.00524 mole) of triethylamine with 60 grams (0.251 val acid) of the above acyloxysiloxane of Formula V. The reaction period amounts to 3.5 hours. After removal of the toluene and the triethylamine in the indicated manner, a product remains which is flowable at room temperature and which exhibits an epoxy content of 0.295 equivalent in 100 grams, while the theoretical amount would be 0.331 equivalent per 100 grams.

EXAMPLE VIII

Reaction of a diepoxy on bisphenol A basis with a di-acyloxypolydimethylsiloxane of Formula III ($R^4$=$CH_3$, Ac=the carboxylic group described in Example VII, to wit, of Versatic 911; $n$=6.22), produced according to U.S. patent application Ser. No. 431,448

358.5 grams (1.45 epoxy equivalents) of a diepoxy of the Formula VII (molecular weight 494) were dissolved in 550 ccm. of toluene and any water which might have been present was liberated by distilling off about 50 ccm. of toluene. This solution was reacted in the manner described in Example III under addition of 0.751 gram (0.00742 mole) of triethylamine with 153.6 grams (0.3805 val acid) of the above diacyloxypolydimethylsiloxane of the Formula III. The reaction period amounted to 4 hours. After removal of the toluene and of the triethylamine in the manner previously referred to, a liquid silicon-modified epoxy resin remained which had an epoxy content of 0.207 equivalent in 100 grams. The theoretical amount would be 0.209 equivalent per 100 grams.

EXAMPLE IX

Comparison of the silicone-modified epoxy resin of Example III with the unmodified epoxy resin used as starting material evaluation of the distribution of the resins and the grid section of the lacquer films)

Both products were well mixed with diethylenetriamine (1.1 H-equivalents for 1 epoxy equivalent) and applied to:

(a) glass plates,
(b) aluminum plates,
(c) iron plates, as clear caulking masses.

The distribution or flow of the silicone-modified epoxy resin is excellent in all three cases, while the unmodified epoxy resin forms many craters, primarily on the aluminum and iron plates. The lacquer films, which were hardened at room temperature, are scratched to form a grid formation (the distance of the individual scratches or grooves being 1 mm.). The lacquer films of the silicone-modified epoxy resin do not flake off in all three cases, while the films of the unmodified epoxy resins become disengaged from the base surface in all three cases.

EXAMPLE X

Hardening of the silicone-modified epoxy resins of Examples III and V with hexahydrophthalic acid anhydride (HHPA)

Mixtures were prepared of:

(a) 10 grams (0.038 epoxy equivalent) of the silicone-modified epoxy resin of Example III, 5.81 grams (0.038 equivalent) HHPA and 0.1 gram of tri(dimethylaminomethyl)phenol and (b) 10 grams (0.0307 epoxy equivalent) of the silicone-modified epoxy resin of Example V, 4.69 grams (0.0307 equivalent) HHPA and 0.1 gram tri(dimethylaminomethyl)phenol. The mixtures are degassed and then heated for 4 hours to 70° C. and subsequently heated for 15 hours to 110° C. Hard castings are produced.

EXAMPLE XI

Testing of lacquer films according to Erichsen. Comparison of the silicone-modified epoxy resin of Example IV and the unmodified epoxy resin The hardened lacquer films of:

(a) The silicone-modified epoxy resin of Example IV, and (b) The unmodified epoxy resin which was used in this example as starting material were examined. The lacquer films had been hardened for 10 hours at room temperature and for 45 minutes at 100° C. Diethylenetriamine (1.1 H-equivalent per 1 epoxy equivalent) was used as hardening agent. The result was:

(a) 10 mm.
(b) 5–6 mm.

The lacquer film of (a) thus has a much better expansibility than is measurable according to the Erichsen test.

While specific embodiments of the invention have been descirbed in detail to illustrate the application of the invention principles, it will be understood that the invention may be embodied otherwise without departing from such principles.

What is claimed is:

1. A process for the preparation of silicone-substituted glycol monoesters of the structural unit $$R_2-\underset{\underset{R_3}{|}}{\overset{\overset{R'}{|}}{Si}}-O-\underset{|}{\overset{|}{C}}-\underset{|}{\overset{|}{C}}-OAc$$

wherein Ac is acyl of a mono- or dicarboxylic acid, and $R^1$, $R^2$ and $R^3$ are the same or different and stand for OAc, alkyl of 1–6 carbon atoms, vinyl, aryl, siloxy or polysiloxy, wherein the remaining valences at the silicon are satisfied by alkyl or aryl, which comprises reacting under substantially anhydrous conditions silicon acylates of the general formula $$R^2-\underset{\underset{R^3}{|}}{\overset{\overset{R^1}{|}}{Si}}-OAc$$

wherein $R^1$, $R^2$ and $R^3$ have the above meaning, with an epoxy group containing compound being ethylene oxide, propylene oxide, epichlorohydrin, n-butylglycidyl ether, $$CH_2-CH-CH_2-O\left[\begin{array}{c}\phantom{x}\\\langle\phantom{x}\rangle-\underset{\underset{CH_3}{|}}{\overset{\overset{CH_3}{|}}{C}}-\langle\phantom{x}\rangle-OCH_2-\underset{\underset{OH}{|}}{CH}-CH_2-O\\\phantom{x}\end{array}\right]_z\langle\phantom{x}\rangle-\underset{\underset{CH_3}{|}}{\overset{\overset{CH_3}{|}}{C}}-\langle\phantom{x}\rangle-OCH_2-CH-CH_2$$

wherein z has a value of between 0–5, aliphatic and cycloaliphatic polyepoxides, in the presence of tertiary amine as catalyst.

2. A process as claimed in claim 1, wherein the realiphatic polyepoxides are 3,4-epoxycyclohexylethyleneoxare satisfied by methyl.

3. A process as claimed in claim 1, wherein said cycloaliphatic polyepoxides are 3,4 epoxycyclohexylethyleneoxide, 6-methyl-3,4-epoxycyclohexanecarboxylic acid - 6-methyl - 3,4 - epoxycyclohexyl-1-methylester, diepoxidized dicyclopentadiene of the formula

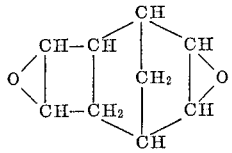

or polyglycidyl ether of pentaerythritol.

4. A process as claimed in claim 1, wherein said tertiary amine has the formula

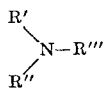

wherein R′, R″ and R‴ are the same or different and represent lower alkyl.

5. A process as claimed in claim 4, wherein R′, R″ and R‴ are methyl, ethyl or propyl.

6. A process as claimed in claim 1, wherein the tertiary amine is ethylmorpholine, triethylene diamine or triethylamine.

7. A process as claimed in claim 1, wherein the tertiary amine is of a kind such that—upon completed reaction—it may be separated from the reaction product by distillation.

8. A process as claimed in claim 1, wherein the amount of tertiary amine is about $2.10^{-3}$ to $1.10^{-1}$ mole/val. acid.

9. A process as claimed in claim 1, wherein the reaction of said silicon acylate and said epoxy group-containing compound is effected at elevated temperature.

10. A process as claimed in claim 1, wherein the reaction is effected with a silicon acylate containing more than one acyl group per molecule.

11. A process as claimed in claim 1, wherein said silicon acylate corresponds to the formula $$R^4_x SiO_y (OAc)_{4-(x+2y)}$$

wherein $R^4$ is hydrocarbon of 1–6 carbon atoms, $x=0$–2.1, $y=0.5$–1.3, and $4>x+2y\geq 1$.

12. A process as claimed in claim 11, wherein $R^4$ is methyl, phenyl or vinyl, $x=1.0$–2.0, and $y=0.75$–1.15.

13. A process as claimed in claim 1, wherein said silicon acylate is a compound corresponding to the formula $$(AcO)_3SiOSi(AcO)_3$$

14. A process as claimed in claim 1, wherein said silicon acylate is a compound of the formula

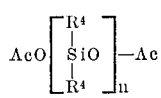

wherein $R^4$ is hydrocarbon of 1–6 carbon atoms and $n=1$–100.

15. A process as claimed in calim 14, wherein $R^4$ is methyl, phenyl or vinyl, and $n=1$–20.

16. A process as claimed in claim 1, wherein said silicon acylate is a compound of the formula

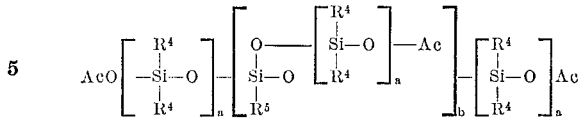

wherein $R^4$ is hydrocarbon of 1–6 carbon atoms, $R^5$ is hydrocarbon of 1–6 carbon atoms, $a$ and $b=0$–100, and one of said $a$ and $b$ not being 0.

17. A process as claimed in claim 16, wherein $R^4$ and $R^5$ are methyl, phenyl or vinyl, $R^5$, however, within the molecule, not being equal to $R^4$, and $a$ and $b=0$–20.

18. A process as claimed in claim 1, wherein said silicon acylate is a compound of the formula

wherein $n=1$–100.

19. A process as claimed in claim 18, wherein $n=1$–20.

20. A process as claimed in claim 1, wherein said silicon acylate is a compound of the formula

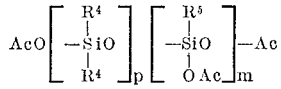

wherein $R^4$ is hydrocarbon of 1–6 carbon atoms, $m$ and $p=0$–100, one of $m$ and $p$, however, not being 0.

21. A process as claimed in claim 20, wherein $R^4$ is methyl, phenyl or vinyl and $m$ and $p=0$ to 20.

22. A process as claimed in claim 1, wherein the reaction is carried out in the presence of an inert solvent.

23. A process as claimed in claim 1, wherein the reaction is carried out within a temperature range of about between 50 to 150° C.

24. Curable and cured silicone-modified epoxy resins whose silicone moiety is linked to the epoxy resin moiety by the structural unit

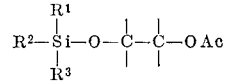

wherein Ac stands for an acyl group of a mono- or dicarboxylic acid, and $R^1$, $R^2$ and $R^3$ are the same or different and stand for OAc, alkyl of 1–6 carbon atoms, vinyl aryl, siloxy or polysiloxy, wherein the remaining valences at the silicon are satisfied by alkyl or aryl, and wherein

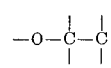

is a radical derived by ring opening of an epoxide selected from the group consisting of ethylene oxide, propylene oxide, epichlorohydrin, n-butylglycidyl ether,

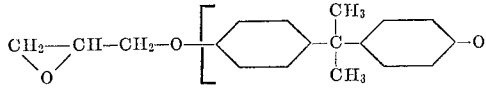

wherein z has a value of between 0–5, and aliphatic and cycloaliphatic polyepoxides.

References Cited
UNITED STATES PATENTS

| | | | |
|---|---|---|---|
| 2,843,560 | 7/1958 | Mika | 260—824 |
| 3,120,546 | 2/1964 | Plueddemann | 260—348 |
| 3,356,758 | 12/1967 | Omietanski et al. | 260—824 |

SAMUEL H. BLECH, Primary Examiner

U.S. Cl. X.R.

117—124, 132, 161; 161—185; 260—2, 46.5, 47, 78.4, 448.8